(No Model.) 2 Sheets—Sheet 1.
F. KAHRS.
GLUE POT.
No. 498,717. Patented May 30, 1893.
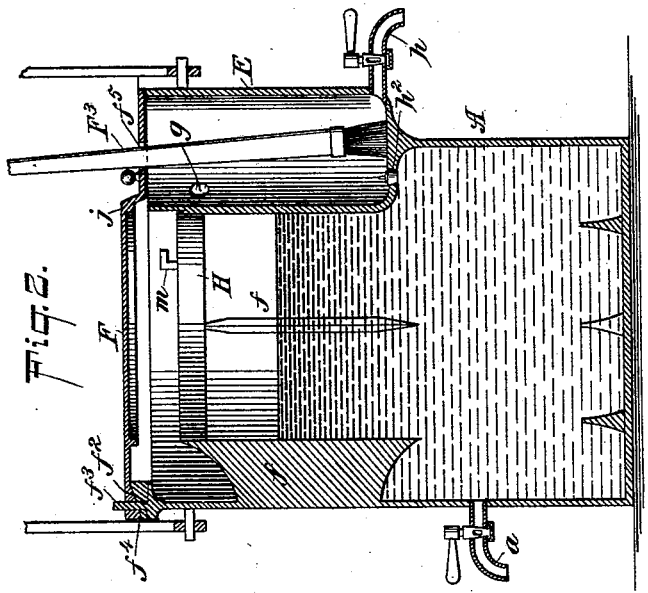
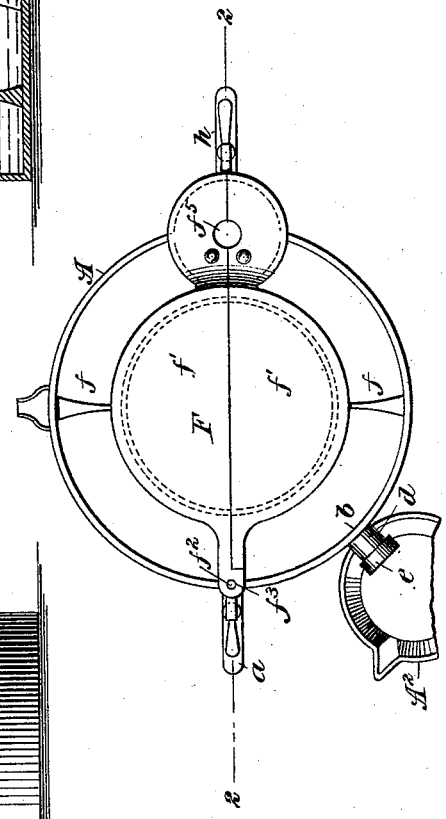
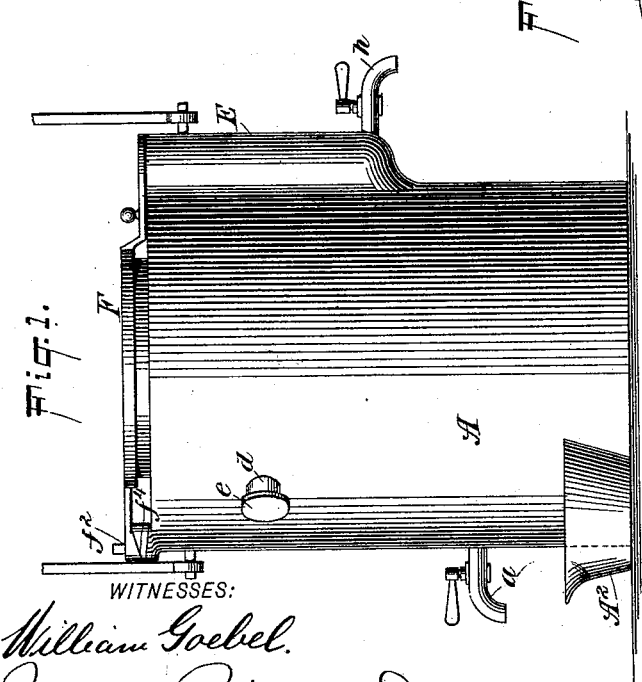
WITNESSES:
William Goebel.
INVENTOR
Friman Kahrs
BY
ATTORNEYS.

(No Model.) 2 Sheets—Sheet 2.
F. KAHRS.
GLUE POT.
No. 498,717. Patented May 30, 1893.
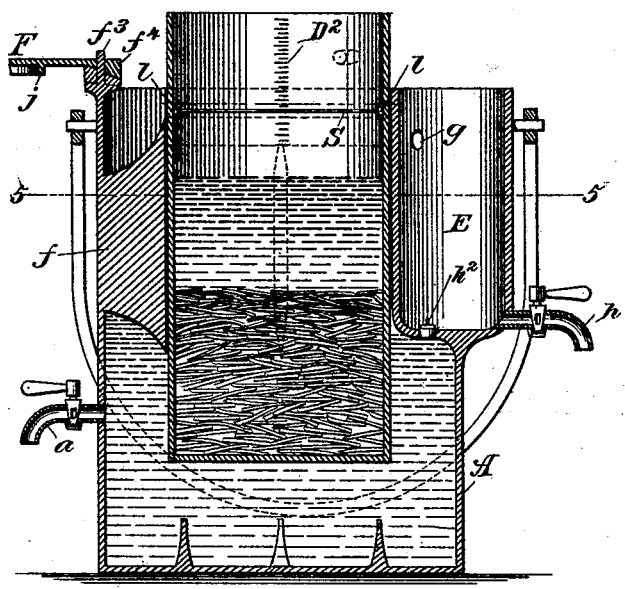
Fig. 4.
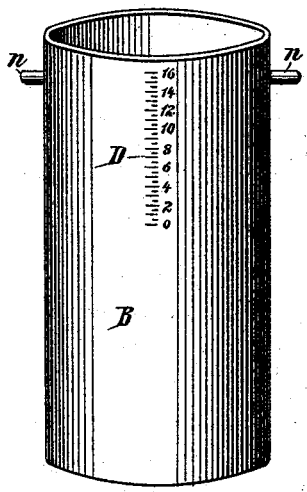
Fig. 6.
Fig. 4ª
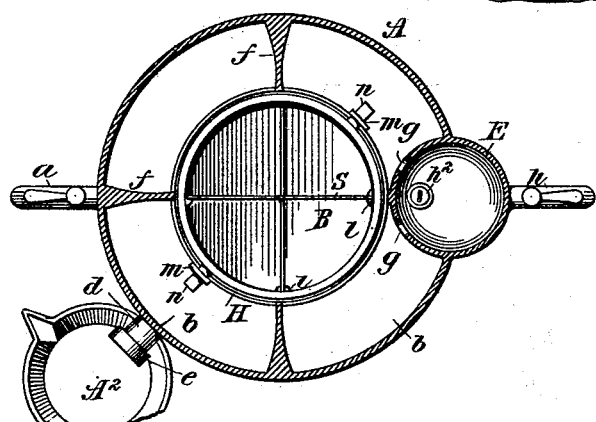
Fig. 5.
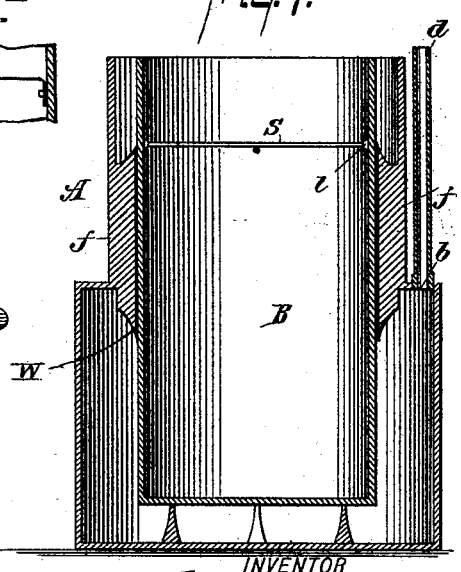
Fig. 7.
WITNESSES:
William Goebel.
M. V. Bidgood
INVENTOR
Friman Kahrs
BY
Bright Bros
ATTORNEYS.
THE NORRIS PETERS CO., PHOTO-LITHO., WASHINGTON, D. C.

United States Patent Office.

FRIMAN KAHRS, OF BROOKLYN, NEW YORK.

GLUE-POT.

SPECIFICATION forming part of Letters Patent No. 498,717, dated May 30, 1893.

Application filed February 3, 1893. Serial No. 460,845. (No model.)

*To all whom it may concern:*

Be it known that I, FRIMAN KAHRS, a subject of the King of Sweden and Norway, residing at Brooklyn, county of Kings, and State of New York, have invented certain new and useful Improvements in Glue-Pots, of which the following is a specification.

The objects of my invention are first, the providing of means whereby the glue or other material or substance to be reduced or operated upon is automatically weighed as it is introduced into the dissolving vessel or chamber; second, the application of the hydrostatic principle whereby the amount of water to be employed in the dissolving process is accurately measured out and determined, such an amount depending upon the weight of glue introduced; third, the measurement of the prepared glue by means of a proper scale as hereinafter described; fourth, the testing of the consistency or thickness of the flow of the dissolved glue; fifth, the providing of a special brush chamber or holder novel in construction; and sixth, the particular construction and arrangement of covers or lids.

The invention also consists in other novel details of improvement and the combinations of parts that will be more fully hereinafter set forth and pointed out in the claims.

Referring to the accompanying drawings, which form a part of this specification, Figure 1 is a side elevation of the glue pot complete. Fig. 2 is a vertical cross section thereof. Fig. 3 is a top view. Fig. 4 is a vertical cross section showing the inner pot in position in the outer pot. Fig. $4^a$ is a detail view. Fig. 5 is a horizontal section of the parts shown in Fig. 4 on the line 5—5 of said figure. Fig. 6 is a side view of the inner pot, and Fig. 7 is a vertical cross section of a modification.

The letter A in the drawings indicates a suitable pot or receptacle adapted to contain water and to permit the latter to be heated. $a$ is a cock or the like at the lower portion of pot A, through which hot water can be drawn to be applied to the glue in the inner pot B, and whereby also it can be determined whether sufficient water is in pot A or not. At the upper part of pot A, is an outlet $b$ preferably provided with a tube $d$, having a screw cap $e$ to close it. The inner wall of pot A is provided with vertical radial webs or partitions $f$, as shown in Figs. 2, 4 and 5 between which the pot B fits, and by which it is guided and kept from tipping. The pot B is considerably smaller than pot A, and is so made that it can float within the latter when water is placed in the pot A. The inner pot B is to receive the glue to be heated and prepared for use. The pot B is provided with a scale or graduation D arranged to indicate the weight of the glue placed in the pot B, by observing its height in the pot. A scale or graduation $D^2$ on the inner upper part of pot B will indicate the quantity of liquid or prepared glue that is produced from a given quantity of glue placed in the pot B.

The outer pot A is preferably provided with a chamber E having an opening $g$ leading into pot A to admit water and steam from the latter to the former, the chamber E being for the purpose of standing the glue brush in to keep it in good condition, (see Fig. 2.) The chamber E is shown provided with a cock $h$, the opening through which acts as a gage to determine the thickness of prepared glue passing through it, by observing the speed of flow or timing the passage of a certain fixed quantity. For example, suppose the opening in cock $h$ is of such a bore that water at 180° Fahrenheit will run through it at the rate of one hundred and fifty cubic centimeters in fifteen seconds. Then by comparing the flow of the heated glue with the above example the user of the glue pot can determine or calculate the density of the heated glue so as to have same uniform, or in other words the cock $h$ is made of a certain diameter to grade the thickness of the liquid by timing the flow of a certain quantity. Thus he can readily determine how much to thin the glue by adding water, or to thicken it by evaporation. A valve $h^2$ in chamber E permits emptying and cleaning of said chamber, and to replace water from chamber E into pot B.

F is the cover for the glue pot. It is provided with an overlapping rim $j$ whereby air can be greatly excluded and steam retained in the pot over the glue, to prevent the formation of a skin on the glue. Steam will also pass through opening $g$ into chamber E to keep the glue from holding the cover fast on the pot. The cover F is made in two parts so that it can open sidewise in two directions, and each part has an aperture $f^2$ to receive a stud $f^3$ on pot A. The parts $f'$ of cover F, have correspondingly inclined faces $f^4$ which act when a slight pressure is applied causing or assisting the cover to close and retaining them in a closed position.

$f^5$ are recesses in the divided edge of cover F to receive the brush $F^3$, see Fig. 2. The cover F also covers chamber E.

S is a removable scraper placed in pot B and consisting of crossed wires or bars entering inwardly extending apertured lugs $l$ carried by pot B upon which scraper the brush may be rubbed. The construction is shown in detail Fig. 4$^a$.

H is a ring connecting the upper parts of the webs or partitions $f$, and serves as a guide by which to read the graduations or scale D on pot B, while at the same time it steadies the pot B when floating. Said ring H is shown provided with arms $m$, adapted to be engaged by projections $n$ on pot B, whereby said pot can be held down when so light as to be forced up by the water in pot A. The projections $n$ also serve as handles in lifting pot B.

For the purpose of indicating when pot A is level, a bead or line $o$ is located on the inner side of said pot so that where the water and bead are aligned it will be known that the pot is level.

The operation of preparing glue for use, with my improved device is as follows:—The screw cap $e$ is first removed and then the pot A is filled to the height of aperture. Pot A is placed in a suitable vessel or receptacle to catch the overflow of water from aperture $b$. The inner pot B is then placed in pot A, which forces a certain amount of water out of aperture $b$ which is caught in the vessel $A^2$ beneath. Glue is then placed in pot B to cause it to sink, a sufficient amount of glue being inserted to force pot B down until the upper mark on its outer side registers with the ring H. The pot B will then contain the proper amount of glue for a pound pot; exactly one pound. If less glue should be put in pot B it will be indicated on the scale. As the glue forces down the pot B more water will escape through aperture $b$ and be caught in the vessel beneath. The water in said vessel will be a proper amount to be added to the glue in pot B to which it is then added, and the screw cap then replaced over aperture $b$. The outer pot A is then fully filled with water which may be heated to prepare the glue, the cover F being placed upon said pots. When the glue is ready for use the scale on inside of pot B will show exactly how much liquid glue is obtained for a certain weight of glue placed in pot B whereby as glue is bought by the pound and used by measure the exact cost can be ascertained. The testing of the prepared glue can readily be effected by means of chamber E as before specified.

By my improved device I am enabled to conveniently and properly prepare the glue to bring it to the desired consistency and also test and measure and thus at the same time determine its cost and value.

It will be understood that the quantity of glue placed in pot B will regulate the amount of water to be added to the glue, the parts being properly proportioned to determine this effect.

It is evident that the device may be used for preparing other substances than glue and when I use the word glue I intend it to cover other material to be treated by the addition of a suitable amount of water, &c.

In the modification shown in Fig. 7, the lower part of pot or receptacle A is larger than the upper part, and a tube $d$ is extended vertically to or above the top of pot A and the tube $d$ is provided with marks showing the gradual rise of the water caused by the addition of weight or material inside of the floating inner pot. When placing the water in the pot A in this form of the device the points W will indicate the proper height for the water before introducing the pot B.

When I use the word pot in this specification, I wish it understood that I mean any suitable receptacle.

Having thus described my invention, the following is what I claim as new therein and desire to secure by Letters Patent:

1. The combination of a pot or receptacle A to contain water and having an aperture $b$ below its top, with an immersible pot to fit in said pot A and arranged to displace a certain amount of water by its own gravity, and a further amount upon receiving glue or substance to be treated, substantially as described.

2. The combination of a pot or receptacle A having an aperture $b$ below its top and a cover for said aperture to permit water to rise above it, with an immersible pot arranged to displace a certain quantity of water by its own gravity, and more water as glue or substance to be treated, is placed in it, as and for the purposes specified.

3. The combination of a pot A having webs or guides $f$, with an immersible pot B adapted to float in pot A and to displace a certain amount of water, substantially as described.

4. The combination of a pot A having webs or guides $f$ and an opening $b$ a ring H carried by them, with an immersible pot B, arranged as and for the purposes specified.

5. The combination of pot A having webs or guides $f$, and an opening $b$ and ring H having arms $m$, with an immersible pot B having projections $n$ to engage said arms as and for the purposes specified.

6. The combination of pot A having aperture $b$ with an immersible floatable pot B having a scale on its inner wall to indicate the quantity of prepared glue, substantially as described.

7. The combination of pot A, chamber E and an opening $g$ in the wall between them with an immersible pot B, as and for the purposes specified.

8. The combination of pot A, chamber E an opening $h^2$ in the wall between them and a valve for said opening with an immersible pot B, substantially as described.

9. The combination of a pot A, chamber E an opening $h^2$ in the wall between them and a stop cock on said chamber for testing the consistency of prepared glue in chamber E with an immersible pot B located in chamber A substantially as described.

10. The combination of pot A having upper opening $b$ and lower stop cock $a$, with an immersible pot B substantially as described.

11. The combination of pot A with a cover divided longitudinally and having inclined faces to accelerate its closing, substantially as described.

12. The combination of pot A having an opening $b$ and immersible pot B, with a cover having overlapping part to cover both pots and tightly close them.

13. The combination of a pot A and chamber E with an immersible pot B, and a centrally divided cover having overlapping parts and covering chamber E.

14. In a glue pot or other similar device, a water containing vessel, with a second vessel, insertible in the larger vessel, the said larger vessel serving as a means, substantially as shown and described, for weighing the material to be dissolved or reduced.

15. In a glue pot or other similar device, a water containing vessel, with a second vessel, insertible in the larger vessel, the said larger vessel having means for hydrostatically determining the weight of the glue or other material introduced into the inner vessel, substantially as shown and described.

16. The combination with a glue pot, of means substantially as shown and described for testing the thickness of the dissolved glue.

17. In a glue pot or other similar device, the combination of the inner and outer vessels the latter adapted to contain liquid to sustain the inner vessel substantially as described, the inner one acting as the receptacle of the material to be prepared and an indicator whereby the loading of the inner vessel is readable as to weight through the application of the hydrostatic principles, as set forth.

18. The combination of a pot or receptacle, an immersible pot therein, a chamber E thereon, and an opening in the wall between said chamber and pot, with a cover on said pot and chamber forming a steam way over the immersible pot, substantially as described.

FRIMAN KAHRS.

Witnesses:
HERBERT KNIGHT,
M. V. BIDGOOD.